US012563449B2

(12) United States Patent
de la Oliva et al.

(10) Patent No.: US 12,563,449 B2
(45) Date of Patent: Feb. 24, 2026

(54) MECHANISM FOR OPERATION OF 3GPP TSN VIRTUAL BRIDGE IN A CENTRALIZED NETWORK/DISTRIBUTED USER MODEL IN A 5G SYSTEM

(71) Applicant: InterDigital Patent Holdings, Inc., Wilmington, DE (US)

(72) Inventors: Antonio de la Oliva, Madrid (ES); Ulises Olvera-Hernandez, Saint-Lazare (CA); Robert Gazda, Spring City, PA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 328 days.

(21) Appl. No.: 18/039,836

(22) PCT Filed: Dec. 3, 2021

(86) PCT No.: PCT/US2021/061815
§ 371 (c)(1),
(2) Date: Jun. 1, 2023

(87) PCT Pub. No.: WO2022/120173
PCT Pub. Date: Jun. 9, 2022

(65) Prior Publication Data
US 2024/0022966 A1     Jan. 18, 2024

Related U.S. Application Data

(60) Provisional application No. 63/121,148, filed on Dec. 3, 2020.

(51) Int. Cl.
*H04W 28/16* (2009.01)
*H04L 47/2416* (2022.01)
*H04W 28/02* (2009.01)

(52) U.S. Cl.
CPC ......... *H04W 28/16* (2013.01); *H04L 47/2416* (2013.01); *H04W 28/0252* (2013.01)

(58) Field of Classification Search
CPC .............. H04W 28/16; H04W 28/0252; H04L 47/2416
See application file for complete search history.

(56) References Cited

U.S. PATENT DOCUMENTS

2020/0267622 A1\*   8/2020   Joseph ................ H04W 40/246
2020/0267785 A1\*   8/2020   Talebi Fard ............ H04L 45/04
(Continued)

FOREIGN PATENT DOCUMENTS

CN          114071499 A   \*   2/2022   .......... H04W 72/543
WO     WO-2020081062 A1  \*   4/2020   .............. H04W 4/70

OTHER PUBLICATIONS

"IEEE Standard for Local and Metropolitan Area Networks—Bridges and Bridged Networks—Amendment 31: Stream Reservation Protocol (SRP) Enhancements and Performance Improvements", IEEE Computer Society, 802.1Qcc-2018, 208 pages.
(Continued)

*Primary Examiner* — Alina A Boutah
(74) *Attorney, Agent, or Firm* — VOLPE KOENIG

(57) ABSTRACT

Methods, apparatuses, and systems for enabling and configuring a time-sensitive networking (TSN) centralized network/distributed user model in a wireless communications system are provided. For example, a method for wireless communications includes receiving configuration information related to forwarding reservation information to a centralized network configuration (CNC) entity, receiving one or more user requests based on the received configuration information, determining reservation information from the received one or more user requests, and sending, based
(Continued)

on the received configuration information, the reservation information to the CNC entity.

12 Claims, 11 Drawing Sheets

(56) References Cited

U.S. PATENT DOCUMENTS

| | | | |
|---|---|---|---|
| 2021/0352536 A1* | 11/2021 | Prabhakar | H04L 43/0852 |
| 2022/0046462 A1* | 2/2022 | De Andrade Jardim | |
| | | | H04W 28/02 |
| 2022/0216932 A1* | 7/2022 | Wang | H04J 3/0641 |
| 2023/0075864 A1* | 3/2023 | Elazzouni | H04L 47/2416 |
| 2023/0189309 A1* | 6/2023 | Ying | H04W 72/51 |
| 2023/0239065 A1* | 7/2023 | Diachina | H04L 47/28 |
| | | | 370/503 |
| 2023/0284077 A1* | 9/2023 | Pateromichelakis | H04L 47/28 |
| | | | 370/235 |

OTHER PUBLICATIONS

"Technical Specification Group Services and System Aspects; System architecture for the 5G System (5GS)", 3rd Generation Partnership Project (3GPP), Stage 2, Release 16, 3GPP TS 23.501 V16.4.0, Mar. 2020, 430 pages.
Nasrallah, Ahmed et al., "Ultra-Low Latency (ULL) Networks: A Comprehensive Survey Covering the IEEE TSN Standard and Related ULL research", arxiv.org, Cornell University Library, Mar. 20, 2018.
3rd Generation Partnership Project; Technical Specification Group Services and System Aspects; Procedures for the 5G System (5GS); Stage 2, (Release 16), 3GPP TS 23.502 V16.4.0, Mar. 2020, 213 pages.
3rd Generation Partnership Project; Technical Specification Group Core Network and Terminals; 5G System (5GS); Time-Sensitive Networking (TSN) Application Function (AF) to Device-Side TSN Translator (DS-TT) and Network-Side TSN Translator (NW-TT) protocol aspects; Stage 3(Release 16); 3GPP TS 24.519 V16.0.0, Mar. 2020, 43 pages.
"IEEE Standard for Local and Metropolitan Area Network— Bridges and Bridged Networks", IEEE Std 802.1Q-2018, IEEE Computer Society, 2018, 1993 pages.
LAN/MAN Standards Comitee of the IEEE Computer Society: "Draft Standard for Local and Metropolitan Area Networks : Multicast and Local Address Assignment "IEEE Draft; 802-1CQ-DO-5, IEEE-SA, Piscataway, NJ USAvol. 802.1cq drafts; 802.1qcq drafts, No. Jun. 30, 2020 (Jun. 30, 2020) , pp. 1-63, XP068169277, Retrieved from the Internet: URL: http://grouper.ieee.org/groups/802/1/files/private/cq-draft s/d0/802-1CQ-d0-5.pdf [retrieved on Jun. 30, 2020].
Volz, Bernie et al., "Link-Layer Address Assignment Mechanism for DHCPv6; RFC 8947", draft-ietf-dhc-mac-assign-05, URL: https://datatracker.ietf.org/doc/draft-ietf-dhc-mac-assign/, 15 pages.
"IEEE Standard for Local and metropolitan area networks—Station and Media Access Control Connectivity Discovery", IEEE Computer Society, 802.1AB-2016, 146 pages.

* cited by examiner

FIG. 8

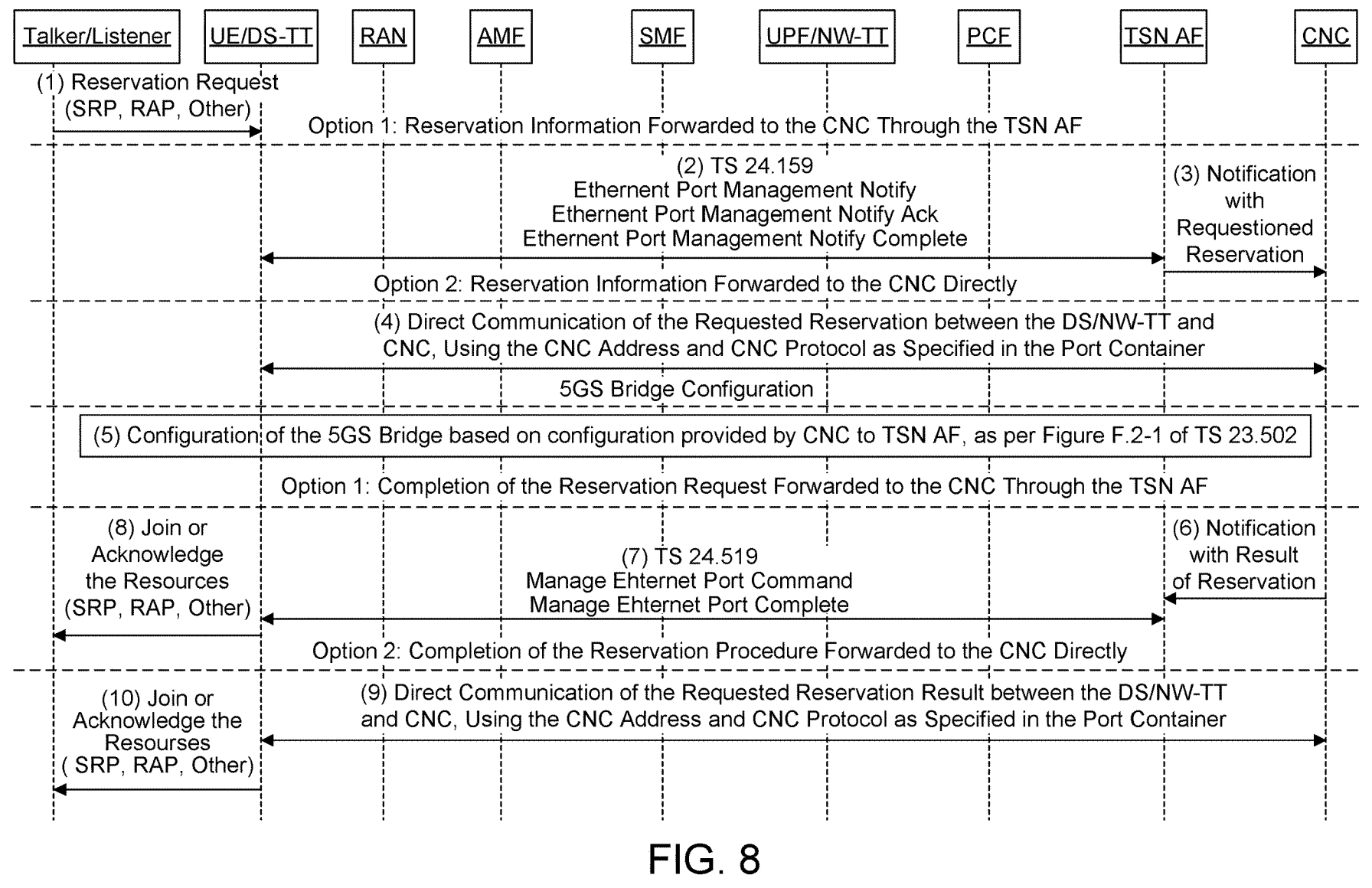

(1) Reservation Request (SRP, RAP, Other)

Option 1: Reservation Information Forwarded to the CNC Through the TSN AF (2) TS 24.159
Ethernet Port Management Notify
Ethernet Port Management Notify Ack
Ethernet Port Management Notify Complete (3) Notification with Requestioned Reservation Option 2: Reservation Information Forwarded to the CNC Directly (4) Direct Communication of the Requested Reservation between the DS/NW-TT and CNC, Using the CNC Address and CNC Protocol as Specified in the Port Container 5GS Bridge Configuration (5) Configuration of the 5GS Bridge based on configuration provided by CNC to TSN AF, as per Figure F.2-1 of TS 23.502

Option 1: Completion of the Reservation Request Forwarded to the CNC Through the TSN AF (6) Notification with Result of Reservation (7) TS 24.519
Manage Ethernet Port Command
Manage Ehternet Port Complete (8) Join or Acknowledge the Resources (SRP, RAP, Other)

Option 2: Completion of the Reservation Procedure Forwarded to the CNC Directly (9) Direct Communication of the Requested Reservation Result between the DS/NW-TT and CNC, Using the CNC Address and CNC Protocol as Specified in the Port Container

(10) Join or Acknowledge the Resourses (SRP, RAP, Other)

Talker/Listener    UE/DS-TT    RAN    AMF    SMF    UPF/NW-TT    PCF    TSN AF    CNC

MECHANISM FOR OPERATION OF 3GPP TSN VIRTUAL BRIDGE IN A CENTRALIZED NETWORK/DISTRIBUTED USER MODEL IN A 5G SYSTEM

CROSS-REFERENCE TO RELATED APPLICATION

This application is a U.S. National Stage Application under 35 U.S.C. 371 of International Patent Application No. PCT/US2021/061815, filed Dec. 3, 2021, which claims priority to and the benefit of U.S. Provisional Application No. 63/121,148 filed in the U.S. Patent and Trademark Office on Dec. 3, 2020, the entire contents of each of which being incorporated herein by reference as if fully set forth below in its entirety and for all applicable purposes.

SUMMARY

The disclosure generally relates to wireless communication networks. One or more embodiments disclosed herein are related to methods and apparatuses for enabling and configuring a time-sensitive networking (TSN) centralized network/distributed user model (e.g., enabled in a 3GPP system) in a wireless communications system. For example, mechanisms for operation(s) of a 3GPP TSN virtual bridge in a centralized network/distributed user model in a 5G system are provided.

In one embodiment, a method (e.g., implemented by a wireless transmit/receive unit (WTRU)) for wireless communications includes receiving configuration information related to forwarding reservation information to a centralized network configuration (CNC) entity, and receiving one or more user requests based on the received configuration information. The method also includes determining reservation information from the received one or more user requests, and sending the reservation information to the CNC entity based on (or using) the received configuration information. In an example, the method may include determining, from the configuration information, an indication that indicates an operation mode is a centralized control/distributed user mode.

In one embodiment, a WTRU comprising a processor, a transmitter, a receiver, and/or memory is configured to implement one or more methods disclosed herein. For example, a WTRU is configured to receive configuration information related to forwarding reservation information to a CNC entity, and to receive one or more user requests based on the received configuration information. The WTRU is further configured to determine reservation information from the received one or more user requests, and to send the reservation information to the CNC entity based on (or using) the received configuration information. In an example, the WTRU may be configured to determine, from the configuration information, an indication that indicates an operation mode is a centralized control/distributed user mode.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the figures and the detailed description are not to be considered limiting, and other equally effective examples are possible and likely. Furthermore, like reference numerals in the figures indicate like elements, and wherein:

FIG. 8 is a message flow diagram illustrating an example of using a centralized control/distributed user model for communications between a DS-TT and the network, according to one or more embodiments.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Communications Networks and Devices

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
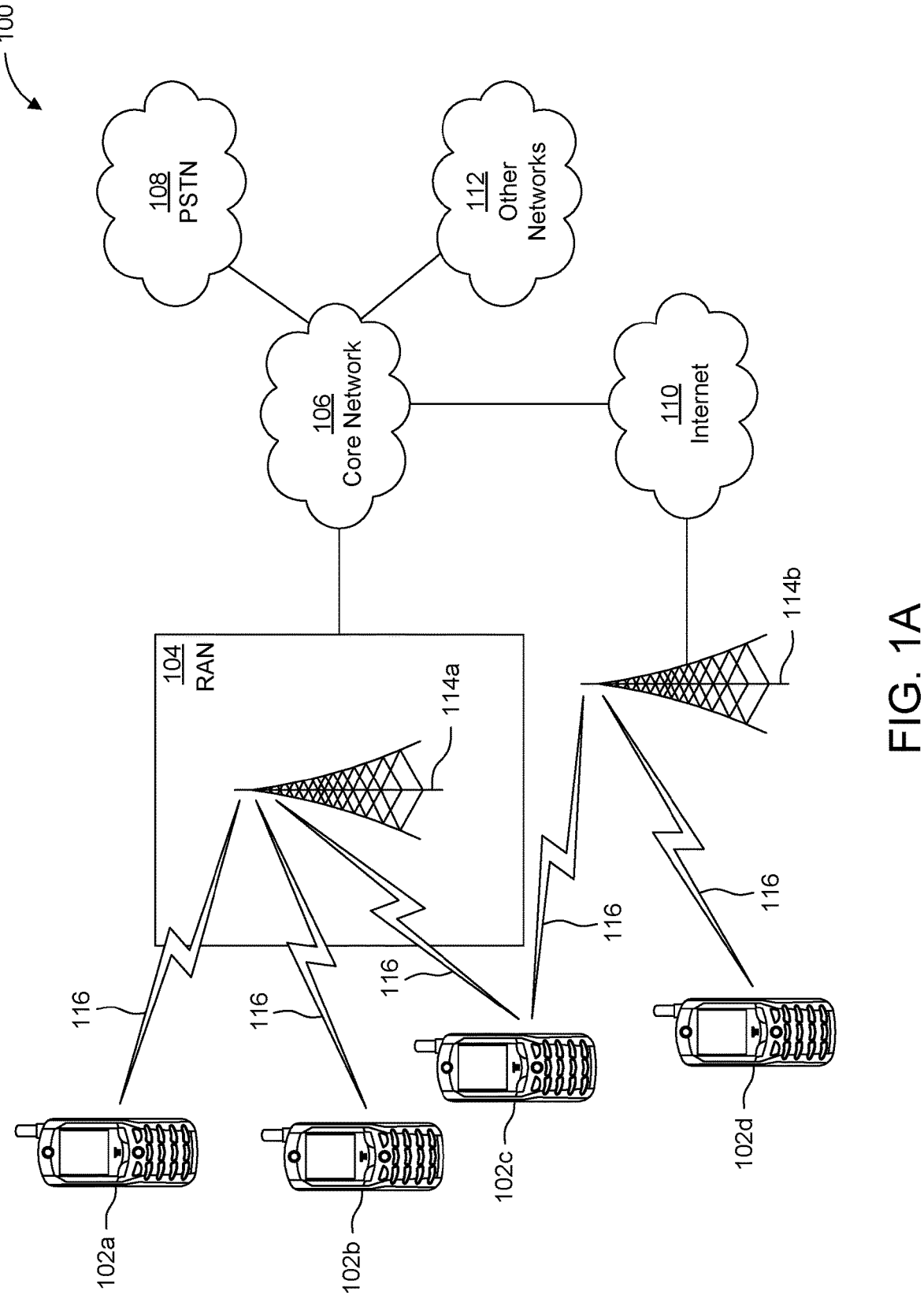
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a New Radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, a Home Node B, a Home eNode B, or an access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology. The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
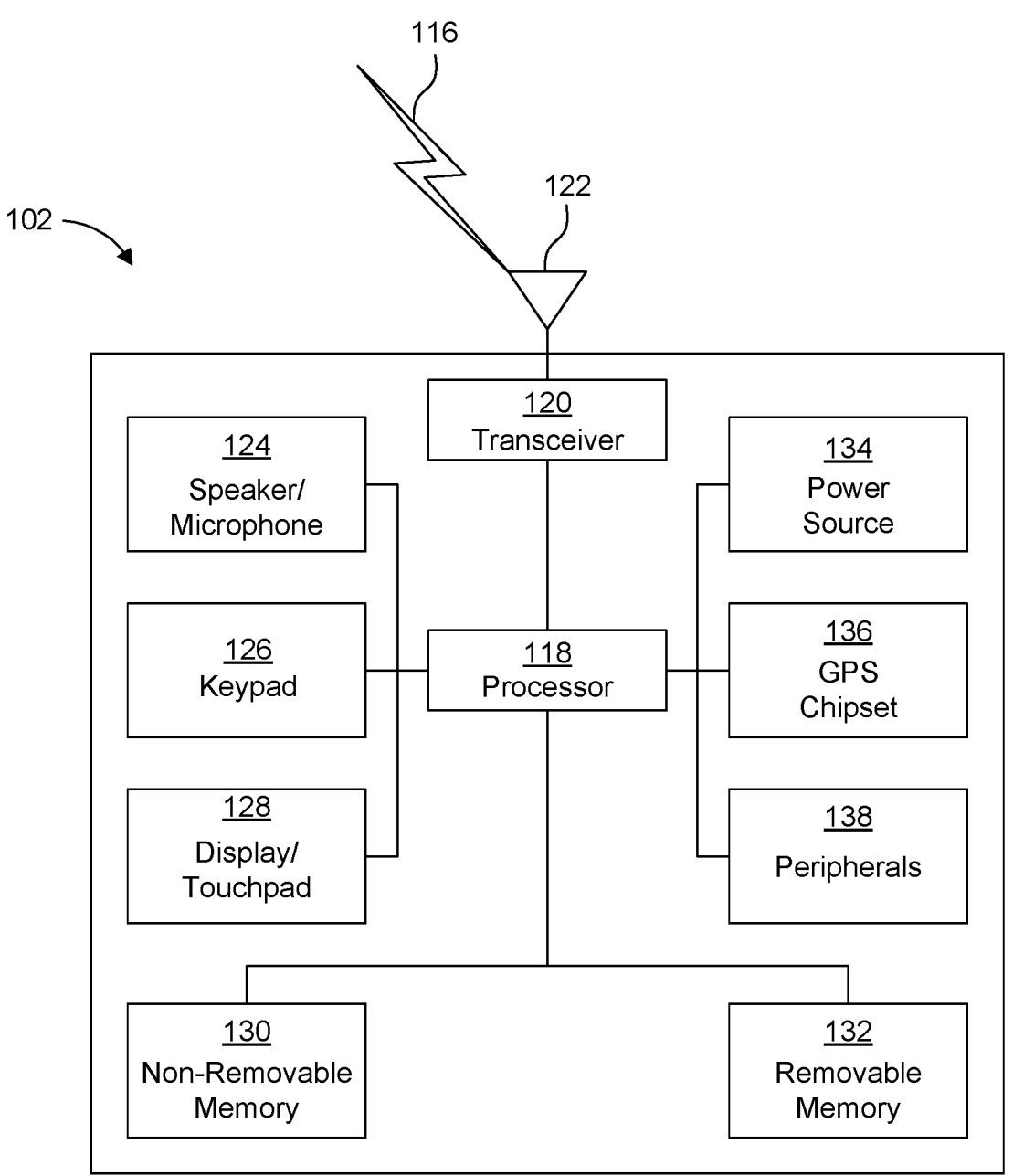
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
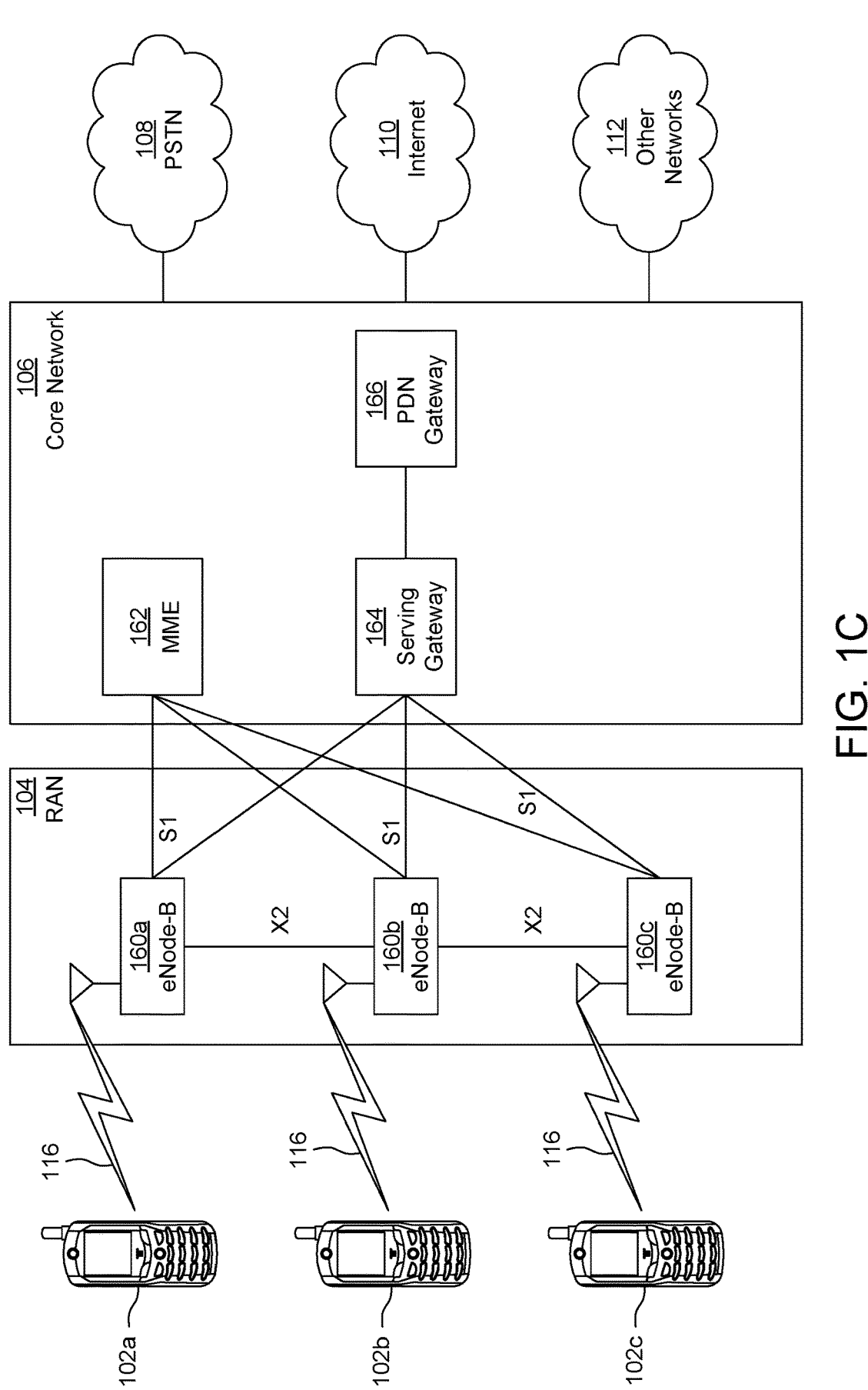
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement M IMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
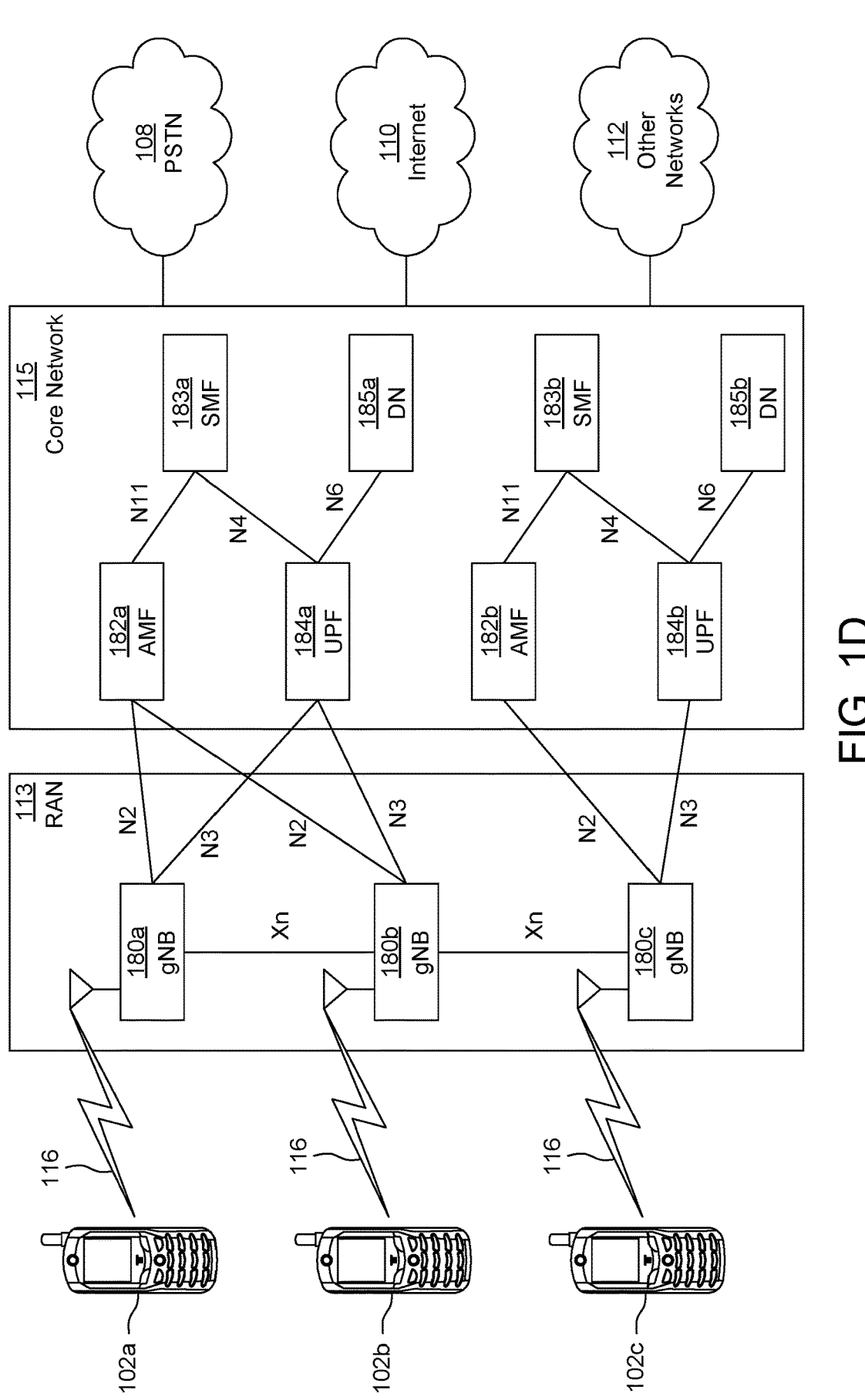
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement M IMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

3GPP Time-Sensitive Networking (TSN)

The 3rd Generation Partnership Project (3GPP) is working towards the definition of an interconnection mechanism for IEEE 802.1 TSN network islands which are interconnected through a 5G network. Currently 3GPP (e.g., Release 16 and/or Release 17) considers the TSN as a fully centralized model, where users and bridges are controlled by centralized entities, not allowing distributed protocols. In various embodiments, modifications to the data types and/or behaviors are provided to enable the operation(s) of a 5G network and TSN networks in a centralized network/distributed user model (e.g., defined in IEEE 802.1Qcc).

3GPP has defined an architecture and one or more mechanisms for interconnecting IEEE 802.1 TSN islands through a 3GPP network (e.g., a 5G network), which enables not only the transport of TSN flows but also the synchronization (e.g., synchronization of clocks) and maintenance of synchronization (e.g., synchronization of clocks) across the networks.

Figure 2:
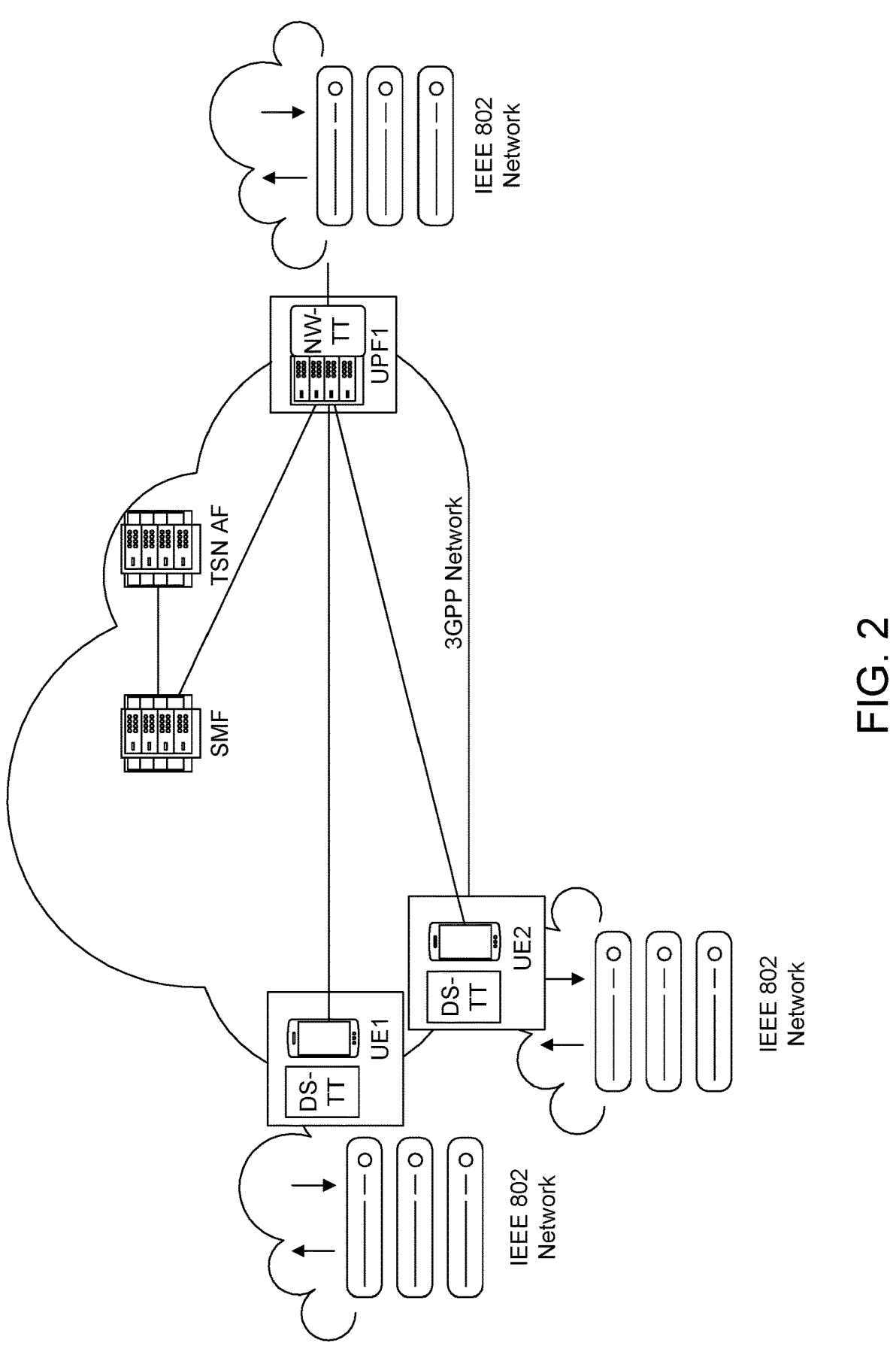
FIG. 2 is a system diagram illustrating a simplified architecture of 3GPP TSN model, according to one or more embodiments.

In an example, FIG. 2 illustrates an architecture defined in 3GPP TS 23.501, Rel-16. In this example, a 5G system is integrated with an external network as a logical TSN bridge. The architecture in FIG. 2 includes two translators in charge of interoperation between an TSN system and the 5G system, for both user plane and control plane. The two translators are Device Side Translator (DS-TT) and Network Translator (NW-TT) (see, e.g., 3GPP TS 24.519, Rel-16). The 5G system-specific procedures (e.g., in a 5G core network (5GC) and a radio access network (RAN), wireless communication links) remain hidden from the TSN network. To achieve such transparency to the TSN network, the 5G system appears as any other TSN bridge(s), by providing TSN ingress and egress ports via DS-TT and/or NW-TT.

In some examples, DS-TT and/or NW-TT may optionally support: 1) hold and forward functionality for the purpose of de-jittering; and 2) per-stream filtering and policing as defined in IEEE 802.1Q (e.g., IEEE 802.1Q-2018). In addition, DS-TT optionally supports link layer connectivity discovery and reporting as defined in IEEE 802.1AB (e.g., 802.1AB-2016) for discovery of Ethernet devices attached to DS-TT. NW-TT supports link layer connectivity discovery and reporting as defined in IEEE 802.1AB for discovery of Ethernet devices attached to NW-TT.

In some current implementations, a 3GPP model for supporting the interconnection of TSN networks assumes/uses a fully centralized model as defined in IEEE 802.1Qcc (e.g., 802.1Qcc-2018). This model is characterized by two entities in charge of configuration of all parameters in the network, as described in FIG. 3. The network configuration information is directed to and/or from a Centralized Network Configuration (CNC) entity. All configuration of bridge(s) for TSN streams is performed by this CNC using a remote network management protocol, such as Network Configuration Protocol (NETCONF), Simple Network Management Protocol (SNMP), and/or Representational State Transfer Configuration Protocol (RESTCONF).

The CNC has a complete view of the physical topology of the network as well as the capabilities of each Bridge, which enables the CNC to centralize complex computations. In some examples, the CNC can be in either an end station or a Bridge.

The end user stations and their requirements in terms of flows are directed to/from a Centralized User Configuration (CUC) entity. The CUC is responsible of discovering end stations, retrieving end station capabilities and user requirements, and configuring TSN features in end stations.

This 3GPP model, known as the fully centralized model as specified in IEEE 802.1Qcc, has several advantages, as this model supports all the scheduling features defined in the TSN family of standards. However, the centralized model requires of modifications and/or third-party support of systems (e.g., CNC and/or CUC) to configure the end users and their flows. TSN has defined two other modes of operation for a TSN network: a fully distributed model, and a centralized network/distributed user model.

Centralized Network/Distributed User Model

Figure 3:
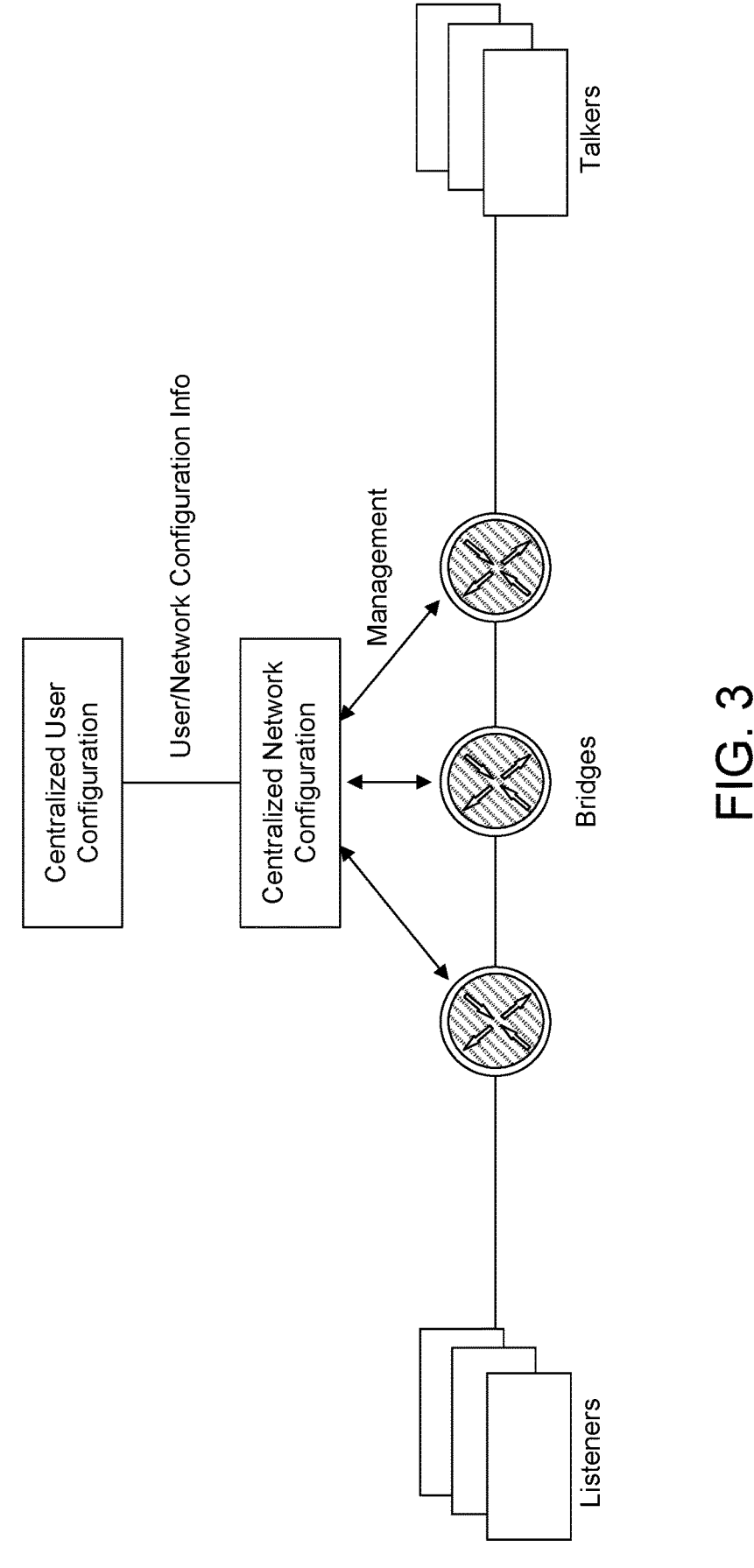
FIG. 3 is a system diagram illustrating an example of a fully centralized model as specified in IEEE 802.1Qcc, according to one or more embodiments.
Figure 4:
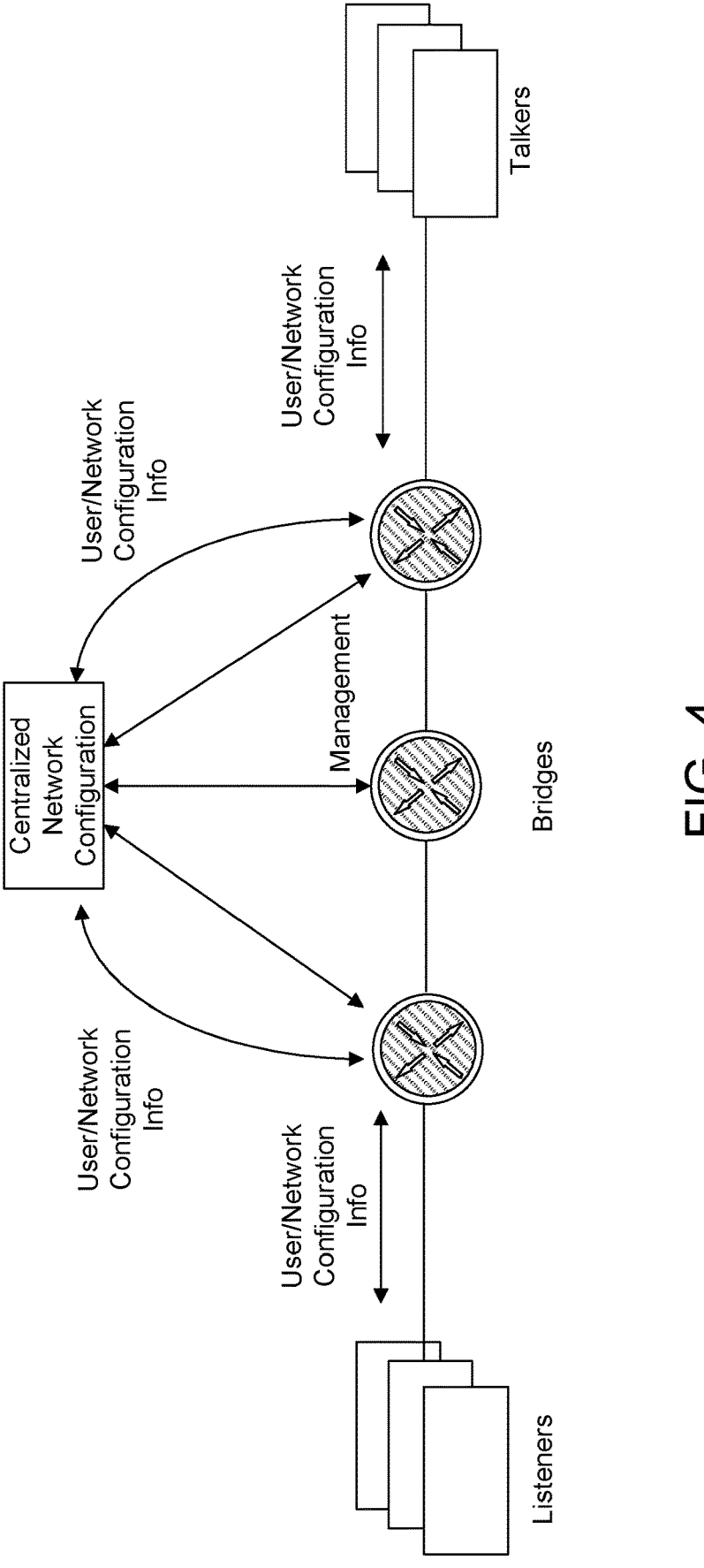
FIG. 4 is a system diagram illustrating an example of a centralized network/distributed user model as specified in IEEE 802.1Qcc, according to one or more embodiments.

Referring to FIG. 4, the centralized network/distributed user model (e.g., defined in IEEE 802.1Qcc) is similar in features to the fully centralized model as defined in FIG. 3. In one embodiment, the centralized network/distributed user model assumes the CNC is in charge of configuring completely the network side of the connection. In an example, a difference between a centralized network/distributed user model and a fully centralized model is: the centralized network/distributed user model does not assume a centralized configuration of the user end stations and flows, enabling clients to use distributed reservation protocols, such as Stream Reservation Protocol (SRP) implementations to talk directly with the network, in order to declare the clients' intentions to transmit or receive information.

In some implementations, SRP may be used to reserve resources in the network when a distributed model is used. In an example, SRP behaves as an application, working on top of the Multiple Registration Protocol (MRP) implemented in bridges in the network. MRP is in charge of distributing declaration of streams by talkers and registrations from listeners. MRP is a distributed protocol, therefore MRP works by exchanging information between the different bridges of the network. Once MRP receives a declaration from a talker, MRP will register ports in bridges connecting listeners, creating the unidirectional reservations needed to forward the flow.

In the case of a centralized network/distributed user TSN model, the CNC may be in charge of configuring the network, therefore MRP does not need to make the resource reservation or the distribution of the declarations/registration. The use of MRP for the user information distribution in this model is defined in IEEE 802.1Qcc. The CNC knows the address of all Bridges at the edge of the network (i.e. those with an end station connected). The CNC configures those edge Bridges to act as a proxy, transferring Talker/ Listener information directly between the edge Bridge and the CNC, rather than propagate the information to the interior of the network.

In some examples, when a bridge connecting end users (e.g., talkers or listeners) receives a SRP or MRP declaration or registration for a flow, the bridge is proxied to the CNC, which will compute the configuration of the network and apply this configuration.

The mechanism used to configure the proxy behavior in MRP is defined in IEEE 802.1Qcc and is known as the MRP External Control procedure in the bridge ports connecting users. In this model, the MRP protocol is used to convey the stream reservation information from users (e.g., talkers or listeners) to the bridge acting as proxy to the CNC. The bridge will use a different network management protocol to forward this information (e.g., the stream reservation information) to the CNC, which enables the end stations to use the same MRP protocol as the fully distributed model.

Supporting a Centralized Network/Distributed User Model from TSN in the 3GPP TSN Bridge The procedure for supporting the centralized network/ distributed User model as specified in IEEE 802.1Qcc is not directly applicable to a 3GPP TSN system (e.g., as stated in 3GPP TS 23.501, Rel-16, clause 4.4.8.2). In the 3GPP TSN system (e.g., as specified in TS 23.501), one of the virtual TSN bridge ports may connect directly to end users (e.g., talkers or listeners), therefore the virtual TSN bridge port may support the forwarding of information to the CNC through the exchange/use of general stream reservation protocols, such as an MRP External Control procedure. The configuration of TSN ports (associated with the DS-TT/NW-TT) is done through 3GPP procedures (e.g., through 3GPP Non-Access Stratum procedures), therefore extension to these procedures may be needed to enable the above discussed behavior in 3GPP TSN bridge(s).

Due to the distributed nature of the 3GPP TSN Bridge, all communications between the CNC and a 3GPP system may be done through a TSN Application Function (AF), that may act as a point of contact for the interaction between the CNC and the 3GPP system. In some current models considered in the 3GPP, users interact with the CUC but not directly with bridges, therefore virtual bridge ports do not send information to the TSN AF regarding requests from the users. Therefore, it may be desired for the TSN AF to configure a Virtual Bridge port as a MRP external control capable port. In addition, the TSN AF may instruct the configured Virtual Bridge port to forward MRP attribute information from the talkers/listeners to the TSN AF, through extensions of the signaling between the DS-TT and NW-TT to the TSN AF. As such, it may be desired to enable and configure the 3GPP TSN DS-TT and/or NW-TT entities to support the TSN centralized network/distributed user model in a 3GPP 5G system.

Figure 5:
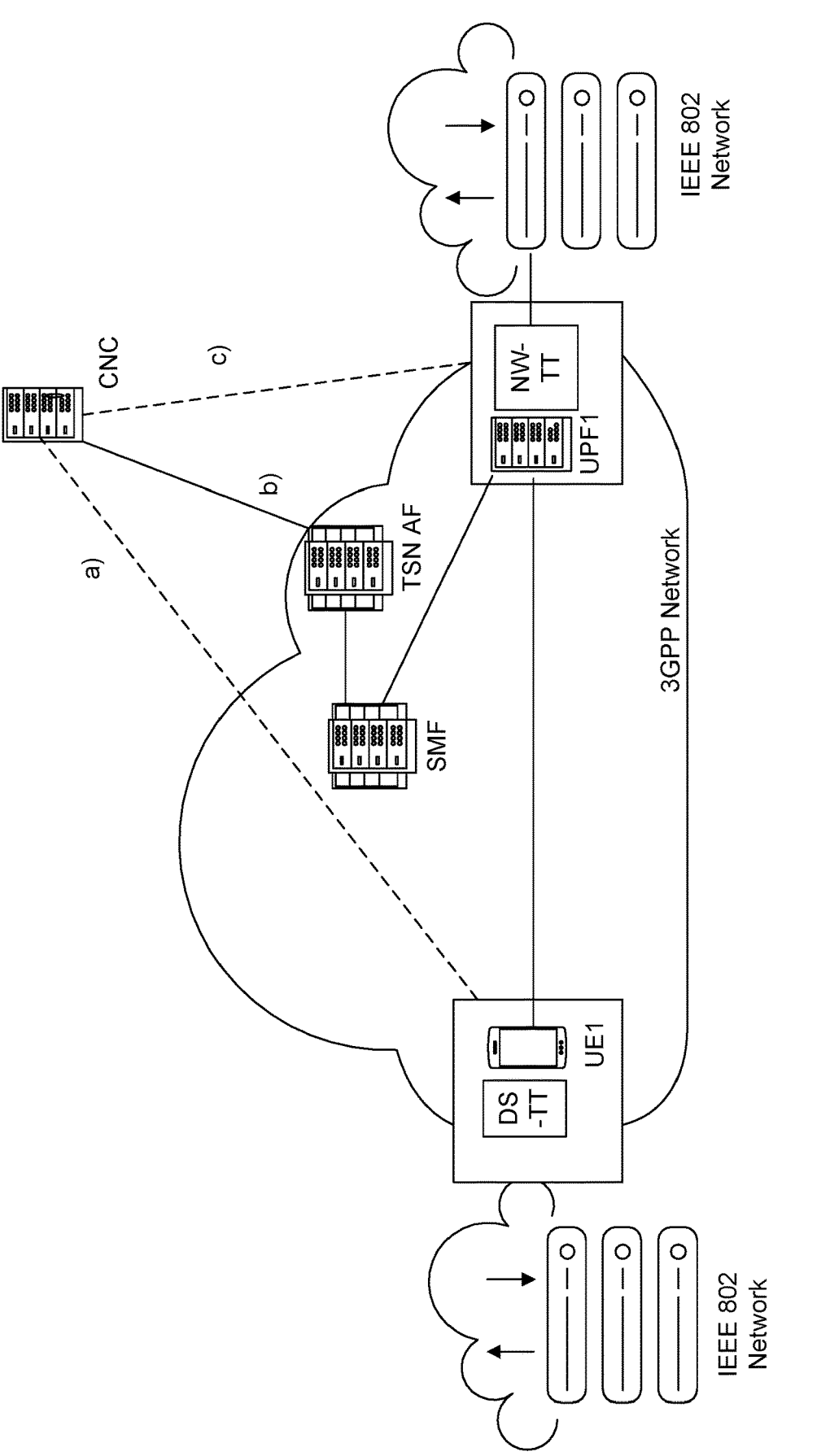
FIG. 5 is a system diagram illustrating an example of a centralized network/distributed user model that includes interaction between a centralized network configuration (CNC) entity and a device side translator (DS-TT) and/or a network translator (NW-TT), according to one or more embodiments.

In various embodiments, user information may be forwarded to the CNC by the TSN AF. To enable or configure this behavior/mechanism, the DS-TT/NW-TT may be able to process (e.g., in general) stream reservation message (e.g., SRP/MRP) user requests and may forward them to the CNC. In some examples, the 3GPP mandates the configuration of the ports in the virtual bridge (interaction with the DS/NW-TT) to be done through the TSN AF. Therefore, one way of interacting with the TTs may be through b) in FIG. 5 (e.g., DS-TT/NW-TT talk to the TSN AF which in turn interacts with the CNC). The CNC may directly interact with the TSN AF to configure the virtual bridge. In some cases, the protocols used for the interaction between the CNC and TSN AF may be, for example, RESTCONF and/or NETCONF.

In various embodiments, the location of the CNC may be considered (e.g., as an important factor). The CNC is in charge of configuring the complete TSN network, so the CNC may be located in one of the networks interconnected by the 3GPP virtual bridge (e.g., connected to the network where the DS/NW-TT ports connect to). As such, in some examples, extra delay may be incurred if a user request is forwarded to the CNC through the TSN AF. Therefore, referring to FIG. 5, direct interaction of the DS/NW-TT with the CNC may be enabled, for example, by enabling a) and c) communication paths in FIG. 5, in addition to b), for reporting of the user requests to the CNC. To enable b), communication can happen, e.g., through any network management protocol such as NETCONF, RESTCONF, and/or similar protocols.

Figure 6:
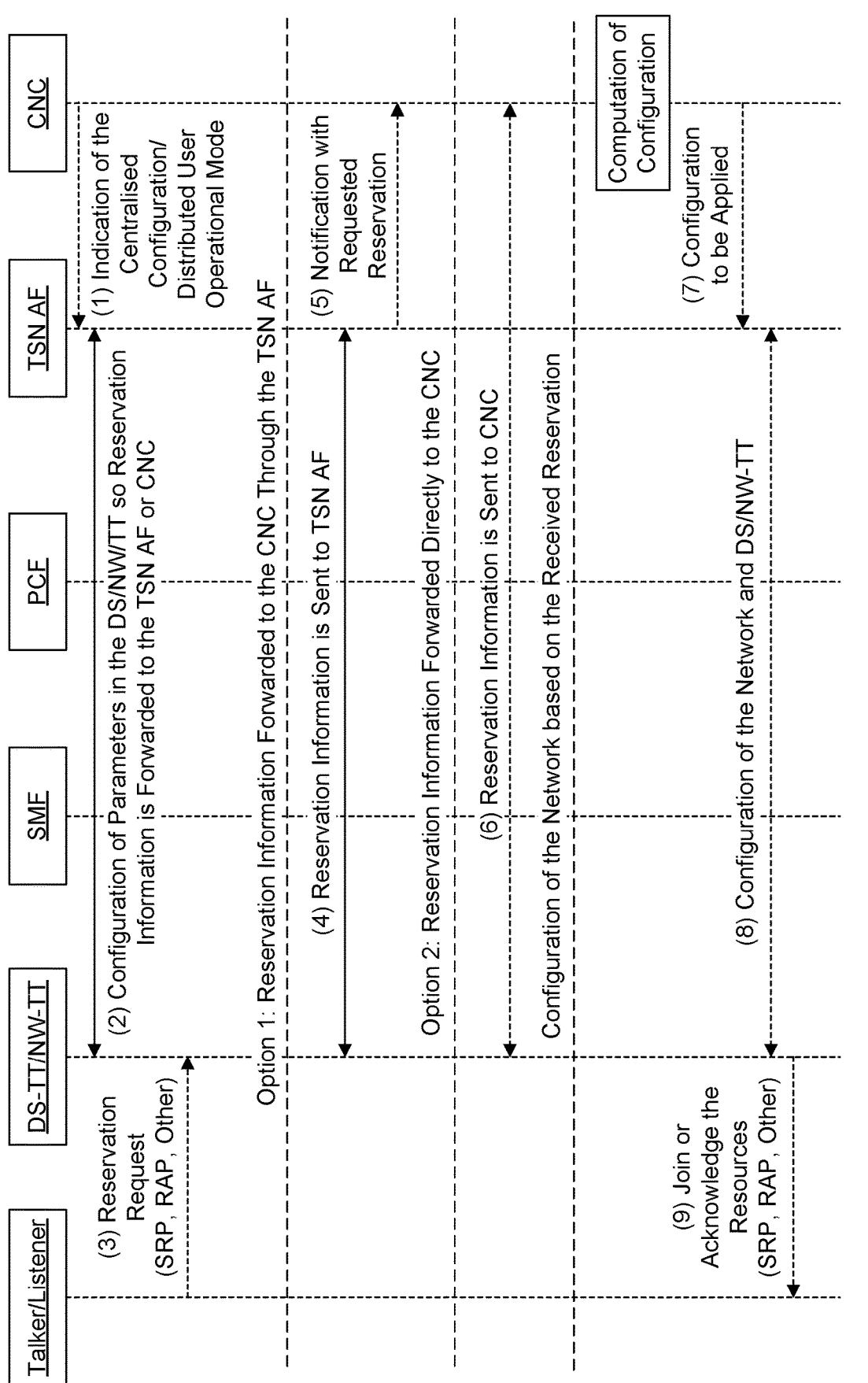
FIG. 6 is a message flow diagram illustrating an example of an overall system behavior/procedure to enable TSN distributed user-control behavior in a 3GPP 5G system, according to one or more embodiments.

FIG. 6 illustrates an example of a procedure of flow messages exchange for an overall system behavior to enable TSN distributed user-control behavior in a 3GPP 5G system. In the example of FIG. 6, solid line interactions may capture new or modified messaging in the procedure. The dotted lines may highlight existing and unmodified messaging that is included for context.

Still referring to FIG. 6, the behavior (e.g., the procedure of flow messages exchange) may start by the CNC indicating the TSN AF about the use of the Centralized Control/ Distributed user model (step (1) in FIG. 6). In this way, the TSN AF knows it may need to configure (step (2) in FIG. 6) the DS-TT and/or NW-TT so the DS-TT/NW-TT may receive user requests and forward them to the CNC (through the TSN AF or directly). Once configured, the DS-TT or NW-TT may receive a user request (e.g., Spanning Tree Protocol (STP), Route Access Protocol (RAP), or other protocols from a talker/listener, as shown in step (3) in FIG. 6), for example, via one or more known IEEE TSN methods. The DS-TT/NW-TT may process the user request, extracting the TSN flow information from the user device. This information (e.g., the TSN flow information) is then forwarded to the CNC. This forwarding may be done through the TSN AF (Option 1, steps (4) and (5) in FIG. 6) or directly to the CNC (Option 2, step (6) in FIG. 6).

After receiving the request from the user, the CNC may compute the required modification in the configuration, which may be indicated to the TSN AF (step (7) in FIG. 6). The TSN AF may reconfigure the 3GPP network and may indicate the DS-TT/NW-TT possible configuration modifications (step (8) in FIG. 6).

The configuration of the DS-TT and/or NW-TT (steps (2) and (4) in FIG. 6) may be performed by transferring of Port Management Information Container(s), for example, between the TSN AF and the DS-TT at a WTRU, to manage the Ports used at the DS-TT (e.g., via NAS signaling between the SMF and the WTRU). The configuration of the NW-TT (e.g., between the TSN AF and the NW-TT) may be handled by configuring ports located at the UPF (or PCF). The messages to control the ports may be included in a Port Management Information Container and may be transported using a PDU session establishment procedure or a PDU session modification procedure as specified in 3GPP TS 23.502 (e.g., 3GPP TS 23.502, Rel-16). Similar behavior (e.g., using an equivalent N4 procedure) may apply to the DS-TT and/or NW-TT.

The communication between the DS-TT/NW-TT and the TSN AF is specified in 3GPP TS 24.519 (e.g., 3GPP TS 24.519, Rel-16). This specification defines the different commands an AF can send to the DS-TT and NW-TT within a Port Management Information Container.

In various embodiments, one or more information elements (IEs) in the Port Management Information Container may be modified to enable and/or configure MRP External control, including information of (or related to) the CNC address and/or 5G system (5GS) bridge identifiers if needed.

The Port management information container is specified in TS 23.501 (e.g., Section 5.28.3, in Table 5.28.3.1-1 Standardized port management information). In one embodiment, in order to configure the new behaviors discussed herein, the following information may be included in the container (e.g., underlined in Table 1):

TABLE 1

Modification to Table 5.28.3.1-1 of TS 23.501 to include the distributed user configuration

| Port management information | Applicability (see Note 6) DS-TT | NW-TT | Supported operations by TSN AF (see Note 1) | Reference |
|---|---|---|---|---|
| General | | | | |
| Port management capabilities (see Note 2) | X | X | R | |
| Bridge delay related information | | | | |
| txPropagationDelay | X | X | R | IEEE 802.1Qcc [95] clause 12.32.2.1 |
| Traffic class related information | | | | |
| Traffic class table | X | X | RW | IEEE 802.1Q [98] clause 12.6.3 and clause 8.6.6. |
| . . . (several rows) | | | | |
| PSFPAdminCycleTime | X | X | RW | IEEE 802.1Q [98] Table 12-33 |
| PSFPTickGranularity | X | X | R | IEEE 802.1Q [98] Table 12-33 |
| MRP External Control | | | | |
| MAP Context | X | X | RW | IEEE 802.1Q [98] clause 10.3.1 |
| externalControl | X | X | RW | IEEE 802.1Qcc Table 12-41 |
| indicationList | X | X | R | IEEE 802.1Qcc Table 12-41 |
| indicationListLength | X | X | R | IEEE 802.1Qcc Table 12-41 |
| indicationChangeCounter | X | X | R | IEEE 802.1Qcc Table 12-41 |
| adminRequestList | X | X | RW | IEEE 802.1Qcc Table 12-41 |
| adminRequestListLength | X | X | RW | IEEE 802.1Qcc Table 12-41 |
| operRequestList | X | X | R | IEEE 802.1Qcc Table 12-41 |
| operRequestListLength | X | X | R | IEEE 802.1Qcc Table 12-41 |
| CNC configuration | X | X | RW | Structure for configuration of the communication towards CNC |

In one embodiment, the CNC configuration element included in Table 1 may include the following elements:

| CNC Address | IP Address/MAC Address/hostname |
|---|---|
| CNC Protocol | Protocol used to communicate with the CNC 0 - SNMP 1 - RESTCONF 2 - NETCONF 3 - TS 24.519 |

-continued

| CNC Address | IP Address/MAC Address/hostname |
|---|---|
| bridgeID | Uint64 |
| NW-TT Port Number | Uinteger |
| DS-TT Port Number | Uinteger |
| PDU Session ID | UInteger |

Each of the new information elements (IEs) included in the Port management information container (PIMC) may be defined in IEEE 802.1Qcc (e.g., Table 12-41). In various embodiments, one or more IEs (e.g., each IE) may be defined per port, therefore each port included in the DS-TT may need to be configured independently. In one embodiment, an explanation of each new IE may be presented as following:

MAP context: MRP Attribute Propagation Context (MAP Context) may identify the set of Bridge Ports that forms the applicable active topology. Examples of MAP Context may be: i) value of 0 indicates Base Spanning Tree Context or ii) a VLAN value indicating the VLAN it applies to.

External control: Boolean variable that when set to True may indicate to the DS-TT/NW-TT that the MRP external interface may be used on this port and MRP requests may be forwarded to the CNC. When the TSN AF is reading information from the port, the value of TRUE in this attribute may indicate that the port supports MRP external interface.

indicationList: This attribute may store the list of all joined MRP attributes for the MRP Participant.

The indicationList may consist of an octet string that may represent multiple MAD_Join.indication primitives in the order initially invoked. This list may be used to indicate the CNC the current status of the port regarding joined MRP attributes.

indicationListLength: The indicationListLength attribute may return the number of octets in the indicationList attribute.

indicationChangeCounter: Counter that may be incremented by one every time there is a change in indicationList.

adminRequestList: List of requests provided by the CNC to the port, for each of the requests in this list, a Join or Leave operation may be triggered.

adminRequestListLength: The adminRequestListLength attribute may provide the value for the number of octets in adminRequestList.

operRequestList: operating list of MAD requests for the MRP Participant. adminRequestList entries may be included in the operRequestList when executed.

operRequestListLength: The operRequestListLength attribute may be the operational value of the adminRequestListLength.

The CNC configuration element may comprise any of:

CNC Address: when present, it may indicate the IP/MAC address or hostname of the CNC. Its non-zero presence may indicate the CNC is directly reachable and direct connection to it is required (Option 2, FIG. 6). A value of 0 or its lack of presence in the container, may indicate that the communication to the CNC may be done through the TSN AF (Option 1, FIG. 6);

CNC Protocol: may indicate the protocol to be used to communicate with the CNC. In case the CNC Address may be set to 0 or not present, then the protocol may be the one specified in TS24.519 since the communication is done through the TSN AF;

bridgeID, NW-TT Port Number, and DS-TT Port Number may refer to the ones defined in TS29.512 and may be used to indicate to the CNC the identification of the bridge and its ports; and/or PDU Session ID, used to identify the relation between the DS-TT and NW-TT.

Annex F of TS 23.502 may present the different steps involved in the 5GS Bridge Information Reporting. The procedure in FIG. F.1-1: 5GS Bridge information reporting (Annex F of TS23.502) may be modified as shown in FIG. 7 to support the centralized network/distributed user model.

Figure 7:
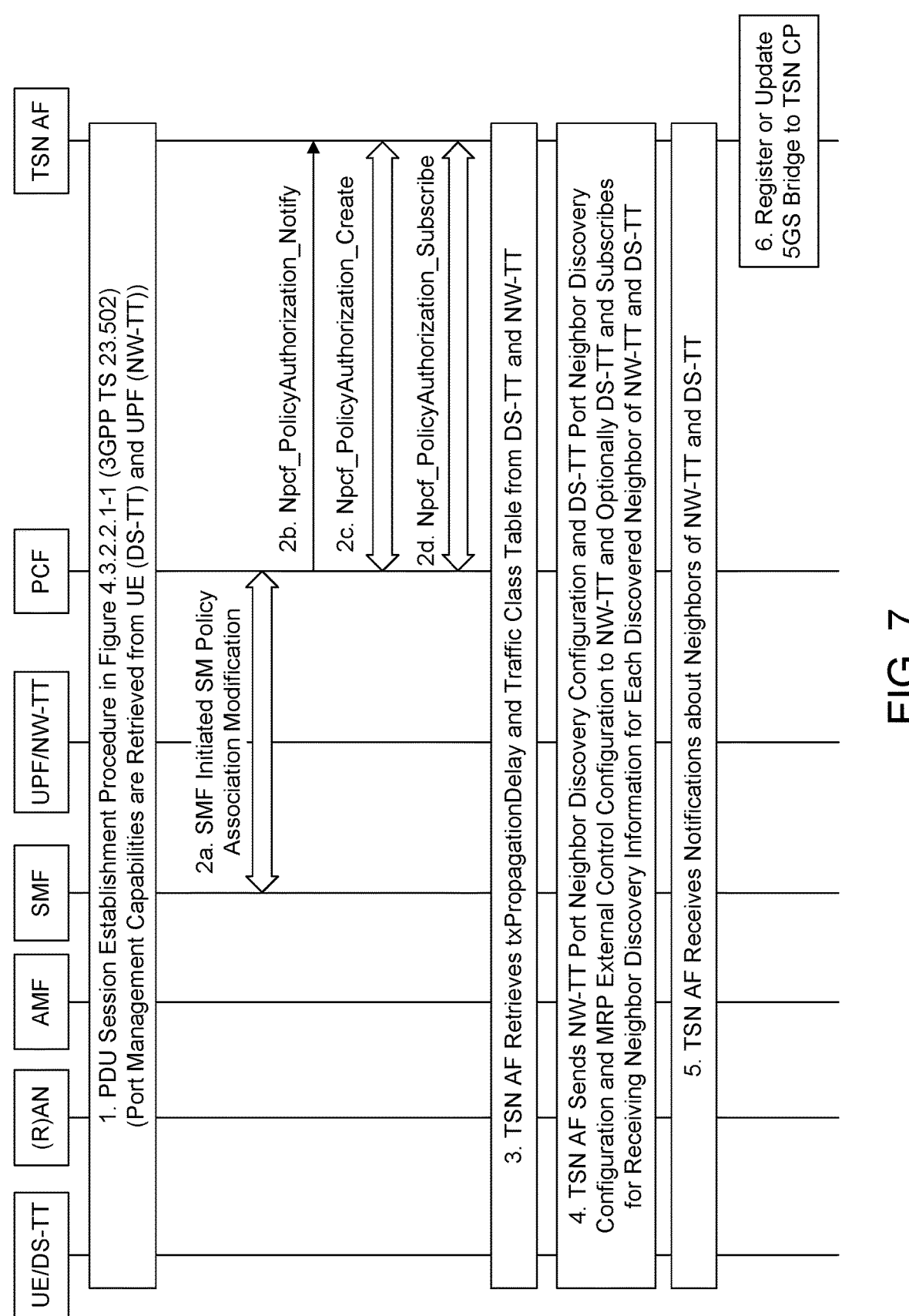
FIG. 7 is a message flow diagram illustrating an example of a procedure of modified 5GS Bridge information reporting, according to one or more embodiments.

In one embodiment, FIG. 7 illustrates an example of a procedure of modified 5GS Bridge information reporting. In some cases, the TSN AF is a point of interaction with the CNC for configuration purposes, therefore the involvement of the TSN AF is needed in all operations of 3GPP TSN Virtual Bridge(s). As shown in FIG. 7, various steps or operations are involved (e.g., via flow messages exchange)

for configuring one or more features of the DS-TT and NW-TT based on their respective capabilities:

1. A first element in this sequence corresponds to a PDU session establishment between the WTRU/DS-TT and the network using standard procedures as per clause 4.3.2.2.1-1 of TS23.502. During this process, the DS-TT may provide its capabilities (e.g., support for a centralized network/distributed user model) and the SMF may select an UPF that may support the requested TSN PDU session, based on supported capabilities (e.g., centralized network/distributed user).

2. The SMF may construct a 5GS Bridge Information with information from the UPF, DS-TT, and/or NW-TT. This structure may comprise the characteristics and IDs needed to support the creation of the virtual bridge, including the new elements as defined and included in the Port Management Information Container.

3. The SMF may send the 5GS Bridge Information to the TSN AF, this message may go through the Policy Control Function (PCF). The SMF exchange of information with the TSN AF is done through the exchange of Port Management Information Containers.

4. The TSN AF may contact the DS-TT and/or NW-TT to get a list of their respective capabilities. These capabilities may include txPropagationDelay, the Traffic Classes supported, the support of Neighbor Discovery, or the support of the Centralized Network/Distributed User model. One or more of the characteristics (e.g., the support of the Centralized Network/Distributed User model) may be indicated by different means, for example, by indicating that the DS-TT port supports MRP external control (e.g., externalControl variable being set to "TRUE" in the Port container).

5. Depending on the different capabilities of the DS-TT/NW-TT, operation/step 5 may enable different configurations. For example, if DS-TT/NW-TT supports neighbor discovery according to the port management capabilities received from DS-TT, the TSN AF may configure and activate the LLDP agent in the port and may subscribe to the Neighbor Discovery Information coming from both virtual ports. In an example, if the DS-TT/NW-TT supports the Centralized Network/Distributed user model, the TSN AF may configure the mechanism used to forward Talker/Listener requests to the TSN AF. This mechanism may be (among others) through the MRP External Control characteristic. In this example, the TSN AF may configure the DS-TT/NW-TT to perform any of the following:

a. Not propagate the Attributes received through MRP on the port;

b. Configure the mechanism that will be used (e.g., SNMP, RESTCONF, NETCONF or TS 24.519) to forward the Attributes (received by MRP) to the TSN AF; and/or c. Configure the CNC Address or indicate that the communication to the CNC is done through the TSN AF. This may also include adding the required identifiers so that the CNC is able to correlate DS-TT/NW-TT and bridge, understanding they may form a single entity.

6. Once the configuration is completed, the DS/NW-TT may send the Attributes indicating the requests from Talker/Listeners directly connected to them to the TSN AF, which in turn may forward them to the CNC. In a different configuration, the DS/NW-TT may directly send the information on the requests from Talker/

Listeners to the CNC (if the configuration of the CNC address and protocol has been provided by the TSN AF).

In one embodiment, once the configuration of the 5GS Bridge is done (e.g., following the procedure defined in FIG. 7), the system may be prepared to receive requests from Talkers/Listeners. FIG. 8 illustrates an example of the operation of the Centralized Control/Distributed users for both configuration options (e.g., Option 1, communication between DS/NW-TT and CNC by the TSN AF, and Option 2, direct communication between the DS/NW-TT and the CNC). FIG. 8 shows an example of the operation between a DS-TT and the network (for simplicity), and the operation of a NW-TT may be same or similar.

In various embodiments, the centralized control/distributed user model may assume the use of the protocol defined in TS 24.519 for the communication between the DS/NW-TT and the TSN AF. Considering the DS-TT and NW-TT, the configuration of parameters may be performed by the TSN AF (e.g., through PCF and/or SMF) by a message "MANAGE ETHERNET PORT COMMAND". Capabilities of the DS-TT Ethernet port may be provided by a message "ETHERNET PORT MANAGEMENT CAPABILITY". Both messages may use the information elements defined in the "Ethernet port management list", as extended in Table 1.

In one embodiment, FIG. 8 illustrates an example of a centralized network/distributed user model/operation. As shown in FIG. 8, in an example, various steps or operations are provided for DS-TT.

Once a reservation (e.g., using SRP, containing a MRP request, or any similar protocol such as RAP) from a Listener/Talker arrives at the DS-TT/NW-TT (step (1) in FIG. 8), the information contained may be transported up to the TSN AF. The mechanism used to transport this information may be used to include new parameters (defined for the PIMC) in the messages (defined in TS 24.519) for the communication of Ethernet port configuration (e.g., between the DS-TT/NW-TT and the TSN AF (step (2) in FIG. 8)).

Additionally, in an example, the DS/NW-TT may configure a direct connection between the DS/NW-TT and the CNC by the use of the CNC configuration parameter of the PIMC (as defined in this document) and use this direct connections to send the requests from Talker/Listeners to the CNC (step (4) in FIG. 8) instead of going through the TSN AF.

Upon computing the best configuration for the network, the CNC may indicate the TSN AF if the flow may be admitted/joined and the configuration that may be applied. The procedure for configuring the network according to the instructions received from the CNC is defined in TS 23.502, FIG. F.2-1, Annex F (step (5) in FIG. 8).

Once the 5GS Bridge configuration is completed, the CNC may inform the DS/NW-TT of the result of the reservation request. This may be done by including the information in the new parameters of the PIMC as defined in this document and include them in a MANAGE ETHERNET PORT COMMAND message, when using the communication through the TSN AF (step (7) in FIG. 8) or via direct communication (step (9) in FIG. 8).

Once the DS/NW-TT receive the MANAGE ETHERNET PORT COMMAND, it may read the Port container and process the adminRequestList. The content of this list may be compared with the operational list of joined MRP attributes, and if needed, a JOIN request or a LEAVE request may be executed by the DS/NW-TT so the DS/NW-TT becomes or leaves a certain stream (step (8) in FIG. 8).

In various embodiments, the TSN AF may coordinate the information exchanged between DS-TT and NW-TT so joining/leaving of a respective TSN stream may be performed simultaneously in both sides of the 3GPP virtual bridge.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice represent- ing cost vs. efficiency tradeoffs. There may be various vehicles by which processes and/or systems and/or other technologies described herein may be affected (e.g., hard- ware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be under- stood by those within the art that each function and/or operation within such block diagrams, flowcharts, or examples may be implemented, individually and/or collec- tively, by a wide range of hardware, software, firmware, or virtually any combination thereof. Suitable processors include, by way of example, a general purpose processor, a special purpose processor, a conventional processor, a digi- tal signal processor (DSP), a plurality of microprocessors, one or more microprocessors in association with a DSP core, a controller, a microcontroller, Application Specific Inte- grated Circuits (ASICs), Application Specific Standard Products (ASSPs); Field Programmable Gate Arrays (FP- GAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modi- fications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or sys- tems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Pro- grammable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtu- ally any combination thereof, and that designing the cir- cuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless com- munication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same function- ality is effectively "associated" such that the desired func- tionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably con- nected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown.

Rather, various modifications may be made in the details within the scope and range of equivalents of the claims and without departing from the invention.

What is claimed is:

1. A method for wireless communications, wherein the method is implemented in a device-side translator (DS-TT) at a wireless transmit-receive unit (WTRU), the method comprising:

receiving configuration information related to sending user reservation information to a centralized network configuration (CNC) entity, wherein the configuration information is received in a port management information container of a message from a time-sensitive networking (TSN) application function (AF) on a non-access stratum (NAS) signal;

receiving one or more user requests;

determining user reservation information based on the one or more user requests; and sending, based on the configuration information, the user reservation information to the CNC entity.

2. The method of claim 1, further comprising:

determining, from the configuration information, an indication that indicates an operation mode is a centralized control/distributed user mode.

3. The method of claim 2, wherein sending the user reservation information comprises sending the user reservation information to the CNC entity directly based on the configuration information indicating 1) an operation mode is a centralized control/distributed user mode and/or 2) location information of the CNC entity.

4. The method of claim 2, wherein sending the user reservation information comprises forwarding the user reservation information through the TSN AF to the CNC entity based on the configuration information indicating 1) an operation mode is a centralized control/distributed user mode and/or 2) the CNC entity is reachable via the TSN AF.

5. The method of claim 1, wherein determining the user reservation information from the one or more user requests comprises:

extracting TSN flow information from the one or more user requests.

6. The method of claim 1, wherein the one or more user requests are received, at the device-side translator, using any of a stream reservation protocol, a spanning tree protocol, a route access protocol, or a multiple reservation protocol.

7. A wireless transmit/receive unit (WTRU) for wireless communications, the WTRU comprising circuitry, including a transmitter, a receiver, a processor, and memory, configured to:

receive, at a device side translator (DS-TT) at the WTRU, configuration information related to sending user reservation information to a centralized network configuration (CNC) entity, wherein the configuration information is received in a port management information container of a message from a time-sensitive networking (TSN) application function (AF) on a non-access stratum (NAS) signal;

receive, at the DS-TT at the WTRU, one or more user requests;

determine user reservation information based on the one or more user requests; and send, based on the configuration information, the user reservation information to the CNC entity.

8. The WTRU of claim 7, wherein the WTRU is further configured to determine, from the configuration information, an indication that indicates an operation mode is a centralized control/distributed user mode.

9. The WTRU of claim 8, wherein the WTRU is further configured to send the user reservation information to the CNC entity directly based on the configuration information indicating 1) an operation mode is a centralized control/ distributed user mode and/or 2) location information of the CNC entity.

10. The WTRU of claim 8, wherein the WTRU is further configured to forward the user reservation information through the TSN AF to the CNC entity based on the configuration information indicating 1) an operation mode is a centralized control/distributed user mode and/or 2) the CNC entity is reachable via the TSN AF.

11. The WTRU of claim 10, wherein the WTRU is further configured to:

when determining the user reservation information, extract TSN flow information from the one or more user requests.

12. The WTRU of claim 8, wherein the one or more user requests are received, at the device side translator, using any of a stream reservation protocol, a spanning tree protocol, a route access protocol, or a multiple reservation protocol.

\* \* \* \* \*